United States Patent
Maloney

(10) Patent No.: US 6,268,953 B1
(45) Date of Patent: Jul. 31, 2001

(54) METHOD AND APPARATUS FOR OPTICALLY MODULATING AN OPTICAL BEAM WITH LONG INTERACTION LENGTH OPTICAL MODULATOR

(75) Inventor: Timothy J. Maloney, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/453,992

(22) Filed: Dec. 2, 1999

(51) Int. Cl.[7] .................................................. G02F 1/00
(52) U.S. Cl. ................................. 359/321; 359/247
(58) Field of Search ................................. 359/247, 248, 359/321, 318, 276; 257/222, 223, 290, 291, 292

(56) References Cited

U.S. PATENT DOCUMENTS

| 4,076,381 | * | 2/1978 | Hammer | 350/96.14 |
| 4,422,088 | | 12/1983 | Gfeller | 357/19 |
| 4,695,120 | | 9/1987 | Holder | 350/96.11 |
| 4,758,092 | | 7/1988 | Heinrich et al. | 356/364 |
| 4,761,620 | | 8/1988 | Bar-Joseph et al. | 332/7.51 |

(List continued on next page.)

OTHER PUBLICATIONS

Miller, DAB: "Reason and Prospects for Dense Optical Interconnections", Presentation by Stanford University Professor, (Oct. 1997).

Sakano, S. et al.: "InGaAsP/InP Monolithic Integrated Circuit with Lasers and an Optical Switch," Electronics Letters, 22(11), May 1986.

Mansuripur, M. and Goodman, JW: "Signal and Noise in Magneto–Optical Readout," J. Appl. Phys., 53(6), Jun. 1982.

"Optoelectronic VLSI Foundry Services From Lucent Technologies", Lucent Technologies Bell Labs Innovations Web Page at http://www.bell–labs.com/project/oevlsi/, updated Mar. 2, 1997.

(List continued on next page.)

Primary Examiner—Georgia Epps
Assistant Examiner—Tim Thompson
(74) Attorney, Agent, or Firm—Blakely, Sokoloff, Taylor & Zafman LLP

(57) ABSTRACT

An optical modulator that modulates light through the semiconductor substrate through the back side of an integrated circuit die. In one embodiment, the optical beam enters through the back side of the semiconductor substrate at a first location. The path of the optical beam is altered such that the optical beam passes through and along and through a path parallel or nearly parallel to the front side of the semiconductor substrate. In one embodiment, the optical modulator includes a charged layer through which the optical beam is directed along the path parallel or nearly parallel to the front side. In one embodiment, the charge concentration of free charge carriers is modulated in response to a signal of the integrated circuit die, resulting in modulation of the optical beam. In one embodiment, after the optical beam passes through the path parallel or nearly parallel to the front side, the path of the optical beam is altered such that the optical beam is directed out through a second location on the back side of the semiconductor substrate. In one embodiment, the first and second locations in the back side are angled or beveled. In one embodiment, refractors are used to alter the path of the optical beam. In another embodiment, grating structures are used to alter the path of the optical beam. In one embodiment, the structure of the present invention may also be used to provide an optical waveguide.

30 Claims, 12 Drawing Sheets

U.S. PATENT DOCUMENTS

| | | | |
|---|---|---|---|
| 4,865,427 | 9/1989 | Kingston et al. | 350/355 |
| 4,871,224 | 10/1989 | Karstensen et al. | 350/96.15 |
| 4,917,450 | 4/1990 | Pocholle et al. | 350/96.11 |
| 4,966,430 | 10/1990 | Weidel | 350/96.11 |
| 5,061,027 | 10/1991 | Richard | 385/14 |
| 5,153,770 | 10/1992 | Harris | 359/245 |
| 5,159,700 | 10/1992 | Reid et al. | 385/14 |
| 5,198,684 | 3/1993 | Sudo | 257/79 |
| 5,400,419 | 3/1995 | Heinen | 385/14 |
| 5,432,630 | 7/1995 | Lebby et al. | 359/152 |
| 5,434,434 | 7/1995 | Kasahara et al. | 257/84 |
| 5,485,014 * | 1/1996 | Jain et al. | 257/21 |
| 5,485,021 | 1/1996 | Abe | 257/84 |
| 5,502,779 | 3/1996 | Magel | 385/1 |
| 5,568,574 | 10/1996 | Tanguay, Jr. et al. | 385/14 |
| 5,605,856 | 2/1997 | Goosen et al. | 437/51 |
| 5,625,636 | 4/1997 | Bryan et al. | 372/50 |
| 5,629,838 | 5/1997 | Knight | 361/782 |
| 5,638,469 | 6/1997 | Feldman et al. | 385/14 |
| 5,696,862 | 12/1997 | Hauer et al. | 385/88 |
| 5,835,646 | 11/1998 | Yoshimura et al. | 385/14 |
| 5,864,642 | 1/1999 | Chun et al. | 385/14 |
| 5,872,360 | 2/1999 | Paniccia et al. | 250/341.4 |

OTHER PUBLICATIONS

"Process for Fabricating OE/VLSI Chips", Lucent Technologies Bell Labs Innovations Web Page at http://www-.bell–labs.com/project/oeflsi/wfabproc.html, updated Sep. 26, 1996.

"Detailed Design Rules for Workshop Chips", Lucent Technologies Bell Labs Innovations Web Page at http://www.bell–labs.com/roject/oevlsi/wdesrule.html, updated Mar. 7, 1997.

Cutolo, A., et al.: Sillicon Electro–Optic Modulator Based on a Three Terminal Device Integrated in a Low–Loss Single–Mode SOI Waveguide in J. of Lightwave Technology, vol. 15(3), Mar. 1997.

Raybon, G., et al.: "A Reconfigurable Optoelectronic Wavelength Converter based on an Integrated Electroabsorption Modulated Laser Array" in 1997 Digest of the IEEE/LEOS Summer Topical Meetings, Montreal, Quebec, Canada, Aug. 1997.

Reiley, DJ, and Sasian, JM: "Optical Design of a Free–Space Photonic Switching System" in Applied Optics, vol. 36(19), Jul. 1997.

Heinrich, HK: "A Noninvasive Optical Probe for Detecting Electrical Signals in Silicon Integrated Circuits", Doctoral Dissertation, Stanford Univ., (Apr., 1987).

Orobtchouk, R., et al., "Quasi–TEoo Singlemode Optical Waveguides for Electro–optical Modulation at 1.3$\mu$m Using Standard SIMOX Material" in IEEE Proc. Optoelectron, vol. 144(2) Apr. 1997.

Soref, RA: "Electrooptical Effects of Silicon" in IEEE J. of Quantum Electron. vol. QE–23(1), Jan. 1997.

Cutolo, A., et al.: "An Electrically Controlled Bragg Reflector Integrated in a Rib Silicon on Insulator Wavequide" in Appl. Phys. Sett. vol 71(2), Jul. 1997.

Silva, MTC, and Herczfeld PR: "Optical Intensity Modulator Based on Electrically Induced Periodic Structure" Optoelectronics and Systems Research Laboratory, Sao Paulo & Center for Microwave and Lightwave Engineering, Drexel Univ., Philadelphia, PA.

Kuwamura, Y, et al.: "Analysis of Operating Mechanism in Semiconductor Optical Modulator with Electron–Depleting Absorption Control" in Electronics and Communications in Japan, vo. 79(5), Dec. 1995.

Liu, MY and Chou, SY: "High–Modulation–Depth and Short–Cavity–Length Silicon Fabry–Perot Modulator with Two Grating Bragg Reflectors" in Appl. Phys. Lett. vol. 68(2), Jan. 1996.

Koren, U., et al.: "A Polarization Insensitive Semiconductor Optical Amplifier with Integrated Electroabsorption Modulators" in Integrated Photonics Research, Apr. 29–May 2, 1996 Technical Digest Series, vol. 6, 1996.

Krishnamoorthy, AV, and Miller, DABM: "Free–Space Optical Interconnections for VLSI Systems: A Technology Roadmap", Conference Proceedings Leos '96 9th Annual Meeting U IEEE Lasers and Electro–Optics (vol. 1,), Nov. 1996.

Goosen, KW: "GaAs MQW Modulators Integrated With Silicon CMOS" in IEEE Photonics Technology Letters, vol.7 (4), Apr. 1995.

Wang, C. et al.: "Ultrafast: All–Silicon Light Modulator," Optics Letter, 19(18), Sep. 1994.

Tada, K. and Okada, Y: "Bipolar Transistor Carrier–Injected Optical Modulator/Switch: Proposal and Analysis," IEEE Electr Dev Ltrs, 7(11), 1986.

Fernando, C. et al: "Si/$Si_{0.85}$/$GE_{0.15}$/Si P–I–N Waveguide Optical Intensity Modulator," SPIE, vol. 2402(131), 1995.

Alping, A et al.: "Highly Efficient Waveguide Phase Modulator for Integrated Optoelectronics," Appl. Phys. Lett., 48(19), May 1986.

Levitan, SP et al.: "Computer–Aided Design of Free–Space Opto–Electronic Systems," DAC 97, Anaheim, California (1997).

Goodman, JW et al.: "Optical Interconnections for VLSI Systems," Proc.IEEE, 72(7), Jul. 1984.

* cited by examiner

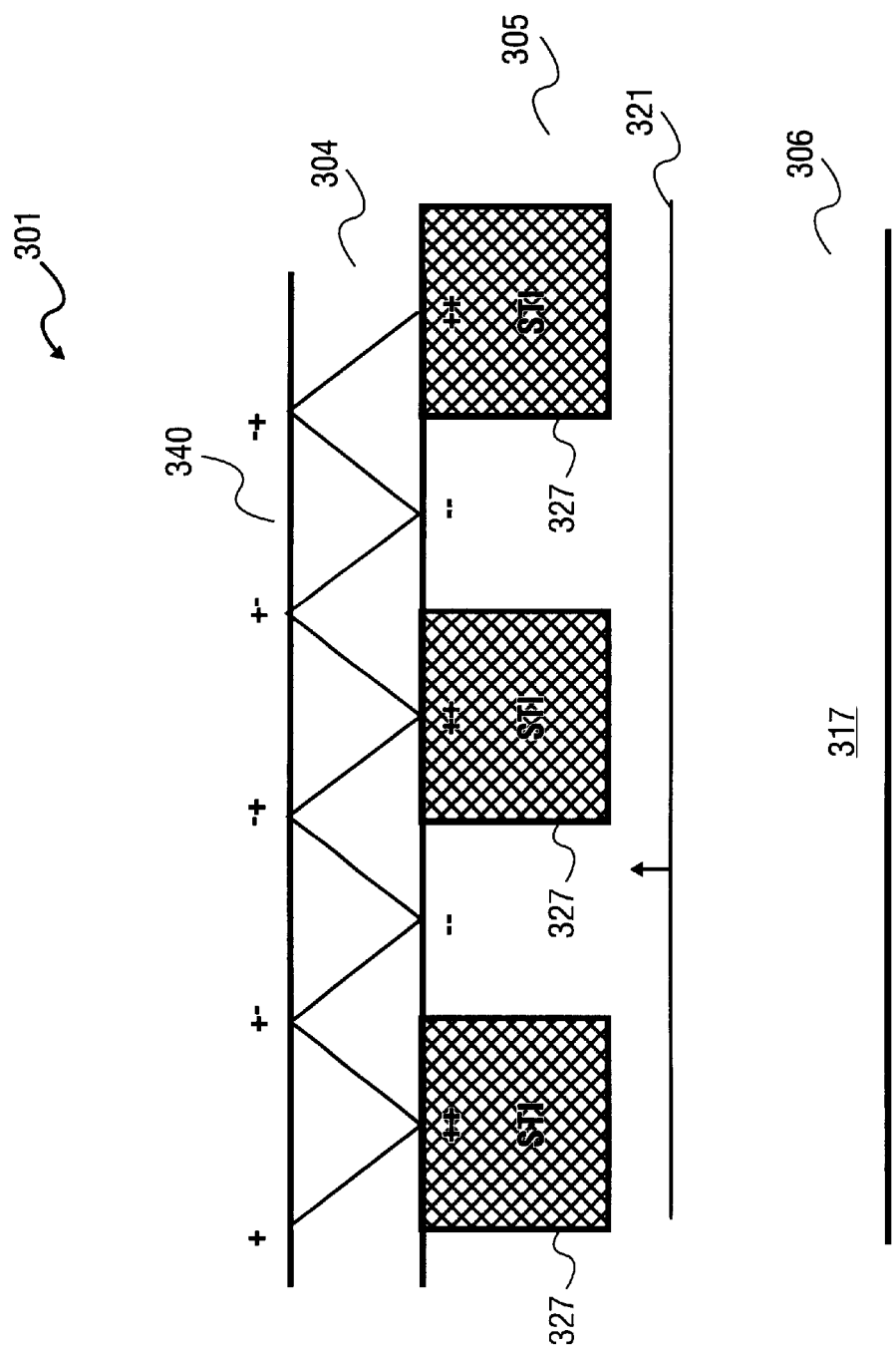

US 6,268,953 B1

METHOD AND APPARATUS FOR OPTICALLY MODULATING AN OPTICAL BEAM WITH LONG INTERACTION LENGTH OPTICAL MODULATOR

BACKGROUND OF THE INVENTION

1. Field of the Invention

The present invention relates generally to integrated circuits and, more specifically, the present invention relates to the modulation of an optical beam using integrated circuits.

2. Background Information

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off chip circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off chip caches, controllers, etc., will be the input/output bandwidth and/or round trip delay between and within chips.

Prior attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power, create large di/dt noise, which requires low inductance packaging and large amount of on-die decoupling capacitance to provide a means of noise suppression, dissipate more heat and occupy more of valuable area on the integrated circuit die than smaller integrated circuit input/output drivers.

Other prior attempts to overcome traditional integrated circuit interconnection limitations have included the use of optical interconnections. The prior attempts at optical interconnections between integrated circuits have generally involved or have been based on two typical approaches.

One approach has been based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine III-V based technology, which includes GaAs, with silicon based metal oxide semiconductor (MOS) technology.

The second typical prior approach is based on using silicon based optical waveguides. These waveguides are generally built using Silicon-on-Insulator (SOI) based processing techniques. Prior SOI based modulators utilize silicon waveguide structures to switch light passing through the optical waveguide. The switching mechanism however utilizes injection of carriers into the waveguide rather like in a bipolar based transistor. One consequence of this is slow speed, for example up to several hundred megahertz, and very high power consumption, for example 10 mW or more for a single switch. In order to increase the modulation depth, one often tries to obtain a large interaction volume between the injected charge and the optical beam. This is generally accomplished by making very long waveguides, for example on order of thousands of microns, thereby increasing the interaction length through which the optical beam travels. As can be appreciated to those skilled in the art, actual incorporation of SOI waveguides into existing multi-layer standard MOS based processing however is not straight forward. Hence, utilization of these waveguide structures becomes quite impractical when used for high speed input/output in large transistor count microprocessors.

Acquiring electrical signals out of integrated circuits is also of great importance for testing integrated circuits. As the circuits get denser, as the size of transistors get smaller and as circuit speeds get faster, electrically probing the internal transistor nodes becomes more difficult, especially with flip chip bonding and other new packaging technologies.

SUMMARY OF THE INVENTION

A method and an apparatus of an optical modulator are disclosed. In one embodiment, an optical modulator includes a metal oxide semiconductor (MOS) transistor disposed in a semiconductor material of an integrated circuit die. The semiconductor material includes a front side and a back side. The optical modulator also includes a charged layer between first and second source/drain regions of the MOS transistor. The charged layer is substantially parallel to the front side of the semiconductor material. The optical modulator also includes first and second refractors disposed on opposite sides of the charged layer in the semiconductor material. An optical beam is to be directed through the back side of the semiconductor material, through the first refractor, through the charged layer, through the second refractor and back out the back side of the semiconductor material. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Figure 1A:
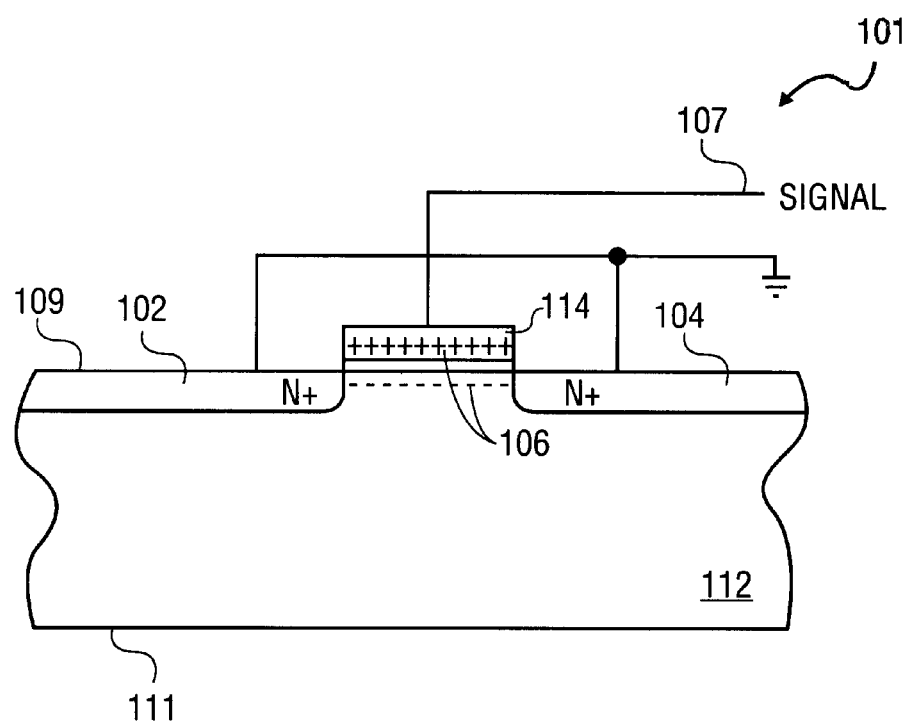
FIG. 1A is a cross section illustration along one direction of one embodiment of an optical modulator to modulate an optical beam in accordance with the teachings of the present invention.

A method and an apparatus providing an optical modulator is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention. In the following detailed description of the invention, reference is made to the accompanying drawings, which form a part hereof, and in which are shown, by way of illustration, specific embodiments in which the present invention may be practiced. In the drawings, like numerals describe similar components throughout the several views. These embodiments are described in sufficient detail to enable those skilled in the art to practice the invention. Other embodiments may be utilized and structural, logical, and electrical changes may be made without departing from the spirit and scope of the present invention.

For purposes of this description, the terms wafer and substrate include any structure having an exposed surface with which to form the integrated circuit structure of the present invention. Both wafer and substrate include, but are not limited to, doped and undoped semiconductors, epitaxy semiconductor layers supported by a base semiconductor or insulator, well regions, as well as other semiconductor structures well-known to one skilled in the art. The term conductor is understood to include conductors and semiconductors, and the term insulator is designed to include any material that is less electrically conductive than the materials referred to as conductors. The following description is, therefore, not to be taken in a limiting sense, and the scope of a present invention is defined only by the appended claims, along with the full scope local ones to which such claims are entitled.

One embodiment of the present invention provides an optical modulator that enables integrated circuit signals to be extracted from integrated circuit output circuit nodes through the back side of the semiconductor wafer or substrate of an integrated circuit die. In one embodiment, an optical beam is directed through the back side of a semiconductor substrate of an integrated circuit die. In one embodiment, the path of the optical beam is altered such that the optical beam is directed through and along a charged layer region in the integrated circuit die in a direction parallel or nearly parallel to the front side of the semiconductor substrate. In one embodiment, the charged layer region is within a polysilicon gate structure of the integrated circuit die and/or in a channel region disposed between source/drain regions of the integrated circuit die. In one embodiment, the charge distribution of free charge carriers in charged region is modulated in response to an electrical signal originating from, for example, an output node of a circuit in the integrated circuit die. In one embodiment, the path of the optical beam is then altered such that the optical beam is directed back out through the back side of the semiconductor substrate of the integrated circuit die.

To illustrate, FIG. 1 shows one embodiment of an integrated circuit die 101 including an optical modulator in accordance with the teachings of the present invention. In one embodiment, integrated circuit die 101 is a controlled collapse chip connection (C4) or flip chip packaged integrated circuit die. As can be appreciated by those skilled in the art, flip chip packaging provides more direct connections between the internal integrated circuit nodes of integrated circuit die 101 and the pins of package substrate, thereby reducing inductance problems associated with typical wire bond integrated circuit packaging technologies. In one embodiment, the internal integrated circuit nodes of integrated circuit die 101 are located towards the front side 109 of integrated circuit die 101. Another characteristic of flip chip packaging is that full access to the back side 111 of the semiconductor substrate 112 of integragrated circuit die 101 is provided. It is appreciated that in another embodiment, integrated circuit die 101 is not limited to being mounted in a flip chip packaged configuration.

In one embodiment, the optical modulator of the present invention includes bipolar charged layers 106 disposed within the integrated circuit die 101. In one embodiment, bipolar charged layers 106 are disposed between doped regions 102 and 104, which are source/drain regions of a MOS gate structure or MOS transistor including a gate 114. In one embodiment, the charge of charged layers 106 is balanced and is negative in the channel and positive on the gate. In one embodiment, the MOS gate structure is electrically addressable and switchable such that the charge distribution of free charge carriers in charged layer 106 can be modulated in response to a signal 107 of integrated circuit die 101.

In one embodiment, doped regions are 102 and 104 are n-type doped silicon region in a p-type silicon semiconductor substrate 112. In another embodiment, doped regions 102 and 104 are p-type doped silicon regions in an n-type silicon substrate 112. It is appreciated that, in general, the present invention covers the types of devices described herein as well as devices including dopants of opposite polarities. For instance, the present invention covers both n-channel and p-channel device structures. Moreover, for purposes of this disclosure, it is appreciated that the term "substrate" is inclusive of layers of the semiconductor substrate including for example well regions, epitaxy layers or the like. In other words, a MOS gate structure of the present invention may exist, for example, in the semiconductor substrate, in an epitaxy layer, in an isolation well, etc., in accordance with the teachings of the present invention.

As mentioned, the free charge distribution in charged layers 106 is modulated in response to signal 107, which in one embodiment is applied to gate 114. In one embodiment, signal 107 is a signal generated by an output node of an integrated circuit included within integrated circuit die 101. Thus, when a voltage of signal 107 is varied, the free charge carrier distribution in charged layers 106 is modulated. It is noted that for purposes of this disclosure, a "charged" region may be interpreted as a highly charged region having free charge carriers.

Figure 1B:
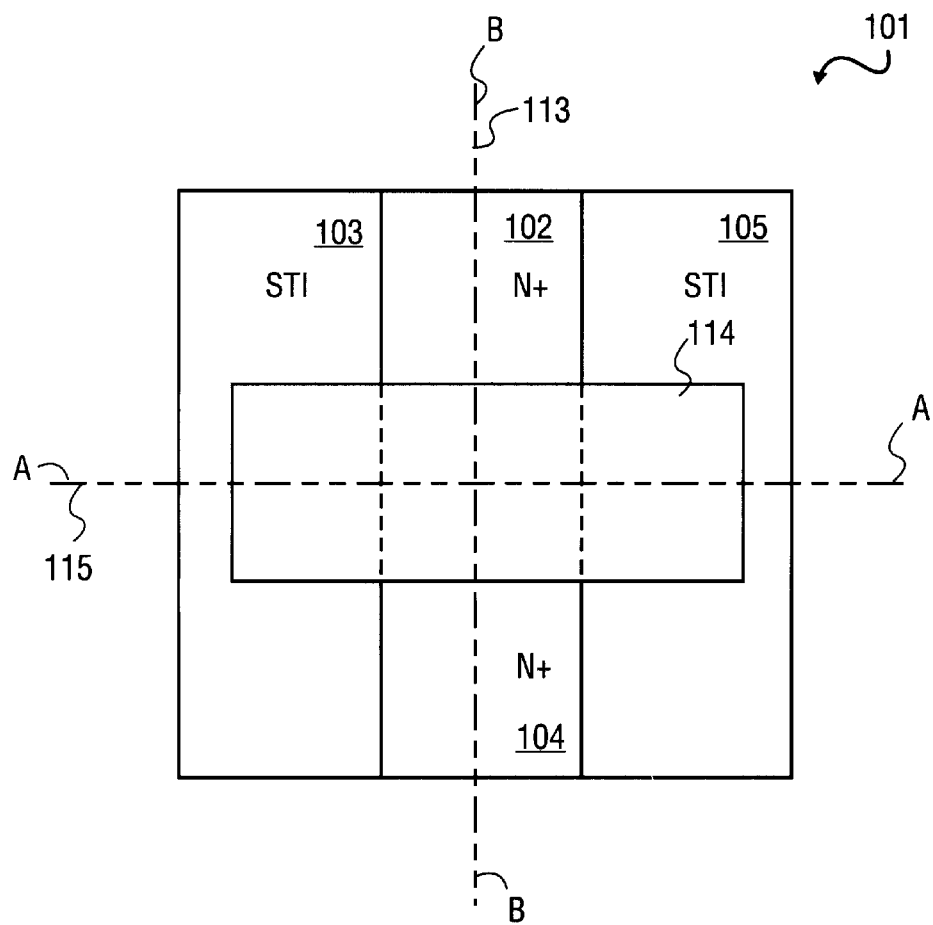
FIG. 1B is a layout view illustration of one embodiment of the optical modulator of FIG. 1A in accordance with the teachings of the present invention.

FIG. 1B is a layout view illustration of integrated circuit die 101 of FIG. 1A. FIG. 1B shows integrated circuit die 101 with the cross-section illustration of FIG. 1A being along line B—B 113 of FIG. 1B. As shown in FIG. 1B, gate 114 is disposed between source/drain regions 102 and 104 along the line B—B 113. As shown in the direction of line A—A 115, gate 114 is disposed over shallow trench isolation (STI) regions 103 and 105.

Figure 1C:
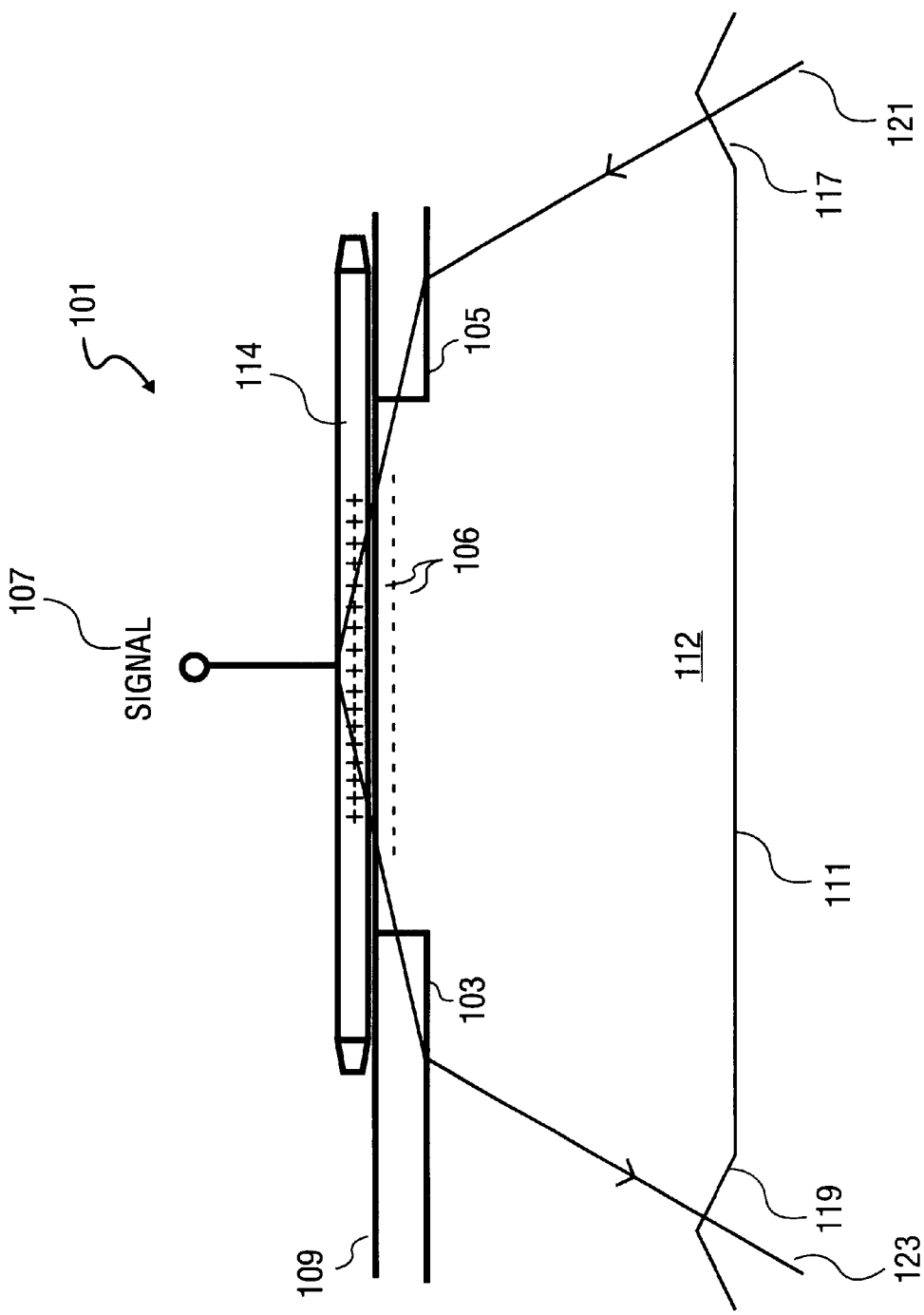
FIG. 1C is a cross section illustration along another direction of one embodiment of the optical modulator of FIGS. 1A and 1B using refractors in accordance with the teachings of the present invention.

FIG. 1C is a cross section illustration of integrated circuit die 101 along line A—A 115 of FIG. 1B. As shown, charged layers 106 are disposed between STI regions 103 and 105. In the embodiment illustrated in FIG. 1C, charged layers 106 are substantially parallel to the front side 109 of semiconductor substrate 112 beneath gate 114. In one embodiment, STI regions 103 and 105 provide refractors that alter the optical path of an incident optical beam 121. In one embodiment, STI regions 103 and 105 include field oxide. In one embodiment, optical beam 121 includes infrared or near infrared light and semiconductor substrate 112 includes silicon. As can be appreciated to those skilled in the art, silicon is partially transparent to infrared light.

In one embodiment, optical beam 121 is directed through the back side 111 of semiconductor substrate 112. In one embodiment, optical beam 121 is directed at an oblique angle to the interface of the silicon of semiconductor substrate 112 and the oxide of STI region 105 resulting in refraction. This refraction alters the path of optical beam 121. In one embodiment, the path of optical beam 121 is altered to be horizontal or nearly horizontal (at angle θ from horizontal or relative to front side 109) through charged layers 106. As result, the path of optical beam 121 through charged layers 106 is in one embodiment parallel or nearly-parallel to the front side 109 of semiconductor substrate 112, and thus is longer by 1/sinθ than for normal incidence. In one embodiment, optical beam 121 is then directed to STI region 103, which alters the path of a modulated optical beam 123 and refracts the modulated optical beam 123 back out through the back side 111 of semiconductor substrate 112.

In one embodiment, optical beam 121 enters back side 111 of semiconductor substrate 112 at location 117. In one embodiment, modulated optical beam 123 exits through the back side 111 of semiconductor substrate 112 at location 119. It is appreciated that locations 117 and 119 may be provided in one embodiment by angling or beveling the back side 111 surface of semiconductor substrate 112 at the entry and exit locations 117 and 119 to enable the angle of propagation for the refraction of optical beam 121 to be horizontal or nearly horizontal through charged layers 106.

In the embodiment illustrated, optical beam 121 is incident to STI region 105 at an angle near the total internal reflection (TIR) angle, such that optical beam 121 refracts at the lower-index interface and propagates horizontal or nearly horizontal through charged layers 106. For example, in one embodiment, semiconductor substrate 112 includes silicon and STI regions 103 and 105 include plasma-deposited silicon oxide. Thus, according to Snell's law, $$n_1 \sin\theta_1 = n_2 \sin\theta_2, \quad \text{(Equation 1)}$$

for optical beam 121 to go from silicon, where $n_1=3.42$, into silicon oxide, where $n_2=1.46$ for plasma-deposited silicon dioxide, the incident angle $\theta_1$ beyond which TIR will take place, and at or slightly below which optical beam 121 will graze through STI regions 103 and 105, is approximately 25.30°, where normal incidence would be $\theta_1=0$. In one embodiment, integrated circuit die 101 is assumed to be in air, where the dielectric constant $n_{air}$ of air is 1. Note that the dielectric constant $n_{air}$ of air is much lower than the dielectric constant $n_2$ of silicon.

As mentioned, the entry and exit locations 117 and 119 in one embodiment are also beveled or angled in order to achieve the angle to result in optical beam 121 having the horizontal or nearly horizontal path through charged layers 106. In one embodiment, a hydrazine-based V-groove etch in silicon may be used to etch the silicon of semiconductor substrate 112 along the (111) planes, which are inclined with respect to the (100) planes (e.g. the silicon surface) to an angle $\sin^{-1}(1/\sqrt{3})$ or 35.3°. In one embodiment, this is close enough to direct optical beam 121 and modulated optical beam 123 into and out of semiconductor substrate 112 at near normal incidence to locations 117 and 119, which pass at a grazing angle through STI regions 103 and 105, as shown in FIG. 1C.

In one embodiment, a reflective material, such as for example a silicide conductor, is disposed over the back side surface of gate 114. In one embodiment, gate 114 includes polysilicon. Thus, polysilicon gate 114 is transparent or nearly transparent to an infrared or near infrared optical beam 121. In one embodiment, this silicided surface of polysilicon gate 114 serves as a deflector or reflector such that optical beam 121, in a near horizontal path through charged layers 106, is reflected between the passage of optical beam 121 through STI regions 105 and 103.

Thus, in one embodiment, optical beam 121 is directed into the back side 111 of semiconductor substrate 112 at location 117, refracted through STI region 105, reflected off the back side of polysilicon gate 114, refracted through STI region 103 and is then directed out through the back side 111 of semiconductor substrate 112 at location 119. In one embodiment, the surfaces at locations 117 and 119 include anti-reflective coatings to reduce attenuation of optical beam 121 and modulated optical beam 123 due to reflections.

In one embodiment, modulated optical beam 123 is generated by modulating optical beam 121 in response to signal 107. In one embodiment, the modulation of optical beam 121 is due to the modulation of the charge concentration of free charge carriers in charged layers 106. In particular, the phase of optical beam 121 passing through charged layers 106 is modulated due to the plasma optical effect. The plasma optical effect arises due to an interaction between the optical electric field vector and free charge carriers that may be present along the propagation path of the optical beam 121. The electric field of the optical beam 121 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers also lead to absorption of the optical field as optical energy is used up, to accelerate the free charge carriers. Generally the refractive index perturbation is a complex number with the real part being that part which causes the velocity change and the imaginary part being related to the free charge carrier absorption. The amount of phase shift $\phi$ is given by $$\phi = (2\pi/\lambda)\Delta nL \quad \text{(Equation 2)}$$

with the optical wavelength $\lambda$ and the interaction length L. In the case of the plasma optical effect, the refractive index change $\Delta n$ due to the electron ($\Delta N_e$) and hole ($\Delta N_h$) concentration change is given by:

$$\Delta n = -\frac{e^2\lambda^2}{8\pi^2c^2\varepsilon_0 n_0}\left(\frac{b_e(\Delta N_e)^{1.05}}{m_e^*} + \frac{b_h(\Delta N_h)^{0.8}}{m_h^*}\right) \qquad \text{(Equation 3)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters. As an end result of the modulation of free charge carrier distribution in charged layers 106, the phase of modulated optical beam 123 is modulated.

Therefore, the MOS gate structure of integrated circuit die 101 forms an optical modulator. As can be appreciated, the total interaction length L of the optical modulator using charged layers 106 is increased by a factor of 1/sinθ, θ the angle of the refracted beam relative to the horizontal or front side 109, due to the passage of optical beam 121 through charged layers 106 through a horizontal or near horizontal path as opposed to a vertical path (e.g. perpendicular to charged layers 106). Thus, the modulation depth of an optical modulator is increased accordingly in accordance with the teachings of the present invention.

Figure 2A:
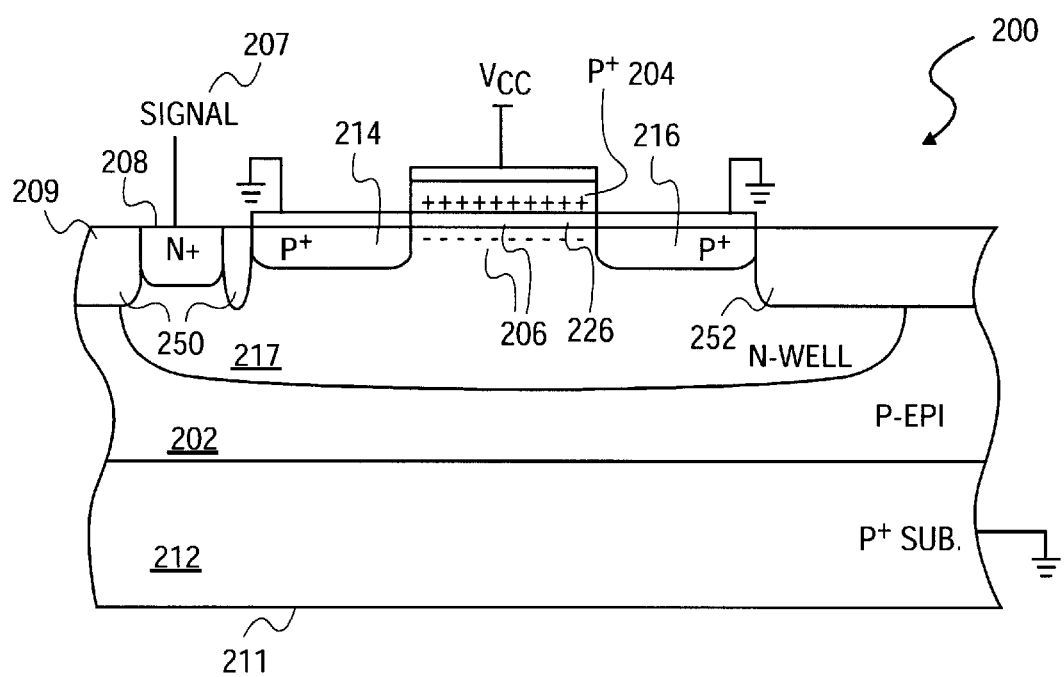
FIG. 2A is a cross section illustration along one direction of another embodiment an optical modulator to modulate an optical beam in accordance with the teachings of the present invention.

FIG. 2A is a cross section illustration of another embodiment of an optical modulator in an integrated circuit die 200 in accordance with the teachings of the present invention. In the embodiment depicted, integrated circuit die 200 is fabricated as a p-type MOS gate structure using a p-epitaxy layer 202 in a p substrate 212 having an n-well 217. Source/drain regions are disposed in the n-well 217 as doped regions 214 and 216. In one embodiment, the MOS gate structure of integrated circuit die 200 includes a gate 204 disposed proximate to doped regions 214 and 216. In one embodiment, integrated circuit die 200 includes a well tap 208. As illustrated in the embodiment depicted in FIG. 2A, well tap 208 is proximate to STI regions 250 and doped region 216 is proximate to STI region 252.

Figure 2B:
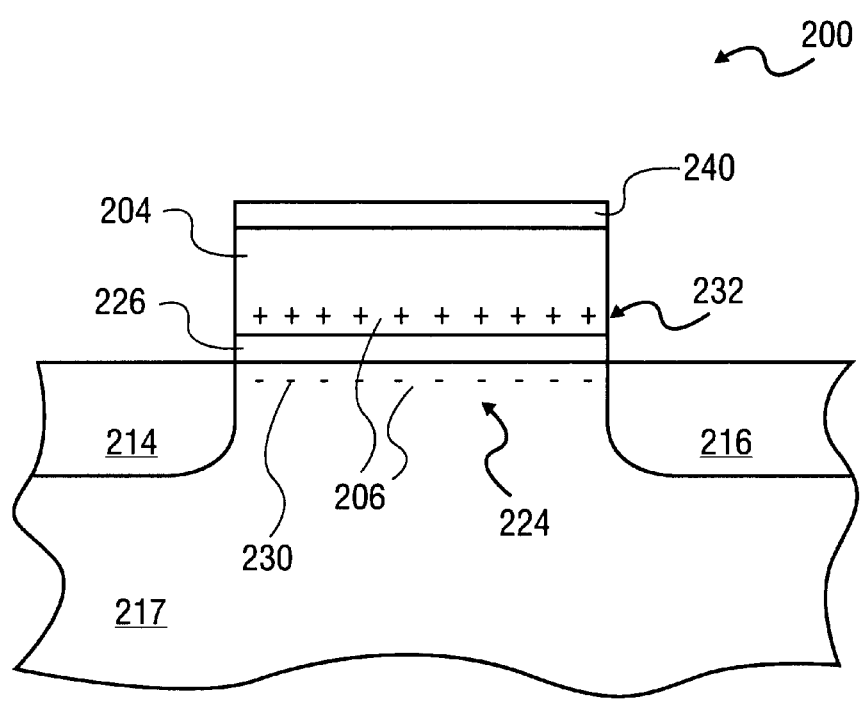
FIG. 2B is a cross section illustration showing greater detail of the charged layer region of the optical modulator illustrated in FIG. 2A in accordance with the teachings of the present invention.

In one embodiment, a signal 207 is applied to well tap 208 to modulate the charge density of free charge carriers in charged layers 206 between doped regions 214 and 216. To illustrate, FIG. 2B shows channel 224 disposed between doped regions 214 and 216. In one embodiment, a gate oxide layer 226 is disposed between a gate 204 and channel 224. In one embodiment, gate 204 includes polysilicon and a layer of silicide 240 is disposed on gate 204. In one embodiment, charged layers 206 include an accumulation layer 230 including electrons in the n-well 217 and an accumulation layer 232 including holes in gate 204.

In one embodiment, the charge distribution of free charge carriers in charged layers 206 is modulated in response signal 207. For instance, with n-well 217 at a low potential (e.g. ground), accumulation layer 230 forms. In one embodiment, gate 204 includes p-doped polysilicon. Thus, an accumulation layer 232 forms in gate 204 with n-well 217 at the low potential. In contrast, with n-well 217 at a high potential (i.e. the opposite logical state), the accumulation layers 230 and 232 are no longer formed. Further, the doped regions 214 and 216, p-epitaxy layer 202, p substrate 212 and the built in voltage of gate 204 actually deplete free carriers in charged layers 206. As a result, the amount of free carrier induced phase shift (and absorption) of an optical beam during one logical state is increased by introducing accumulation layers 230 and 232. In the other logical state, the amount of free carrier induced phase shift is reduced by introducing depletion layers in place of accumulation layers 230 and 232.

Referring to the embodiment illustrated in FIGS. 2A and 2B, the accumulation layers 230 and 232 are modulated by toggling the n-well 217 potential. In another embodiment, the gate 204 can be toggled with the n-well 217 and doped regions 214 and 216 coupled to ground. In yet another embodiment, both gate 204 and n-well 217 potentials can be toggled to complementary states. In yet another embodiment, the polarities of the dopants of the integrated circuit die 200 can be reversed.

Figure 2C:
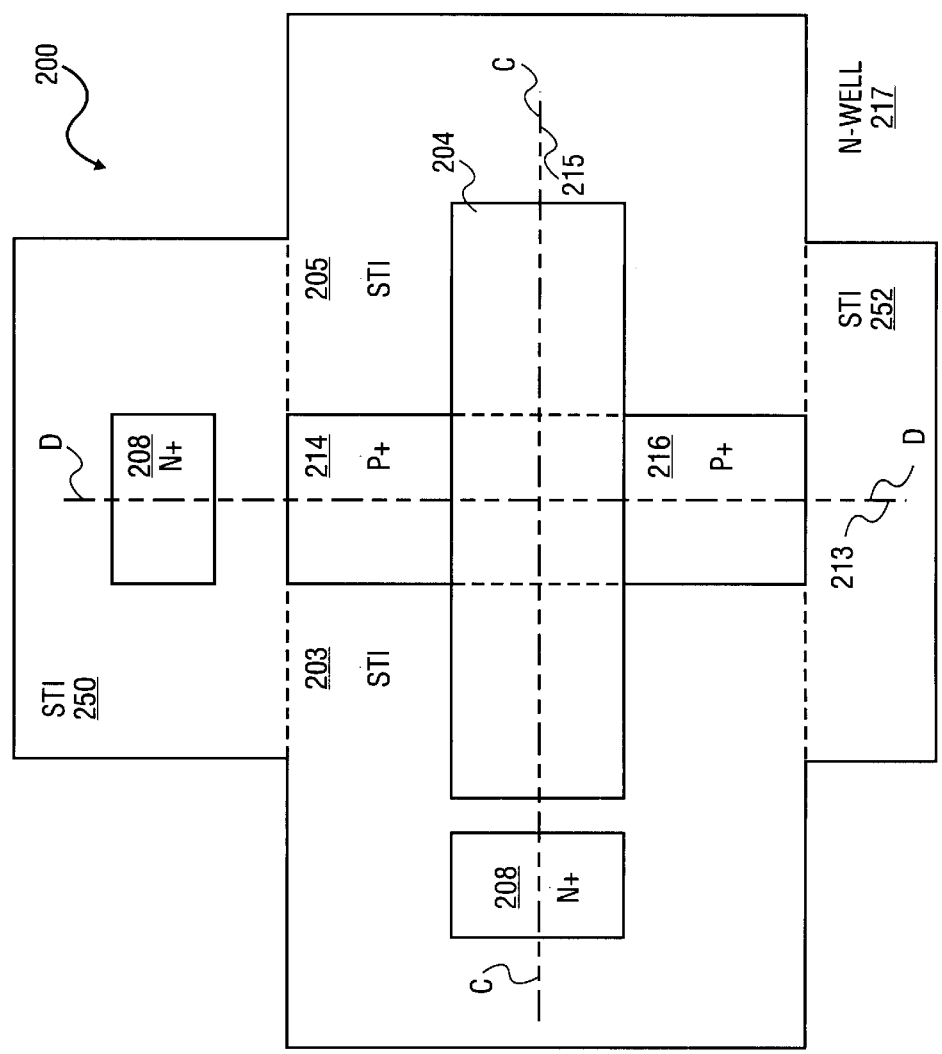
FIG. 2C is a layout view illustration of one embodiment of the optical modulator of FIGS. 2A and 2B using refractors in accordance with the teachings of the present invention.

FIG. 2C is a layout view illustration of integrated circuit die 200 of FIGS. 2A and 2B. FIG. 2C shows integrated circuit die 200 with the cross-section illustration of FIGS. 2A and 2B being along line D—D 213 of FIG. 2C. As shown in FIG. 2C, gate 204 is disposed between doped regions 214 and 216 along the line D—D 213. In the direction of line C—C 215, gate 204 is disposed over shallow trench isolation (STI) regions 203 and 205.

Figure 2D:
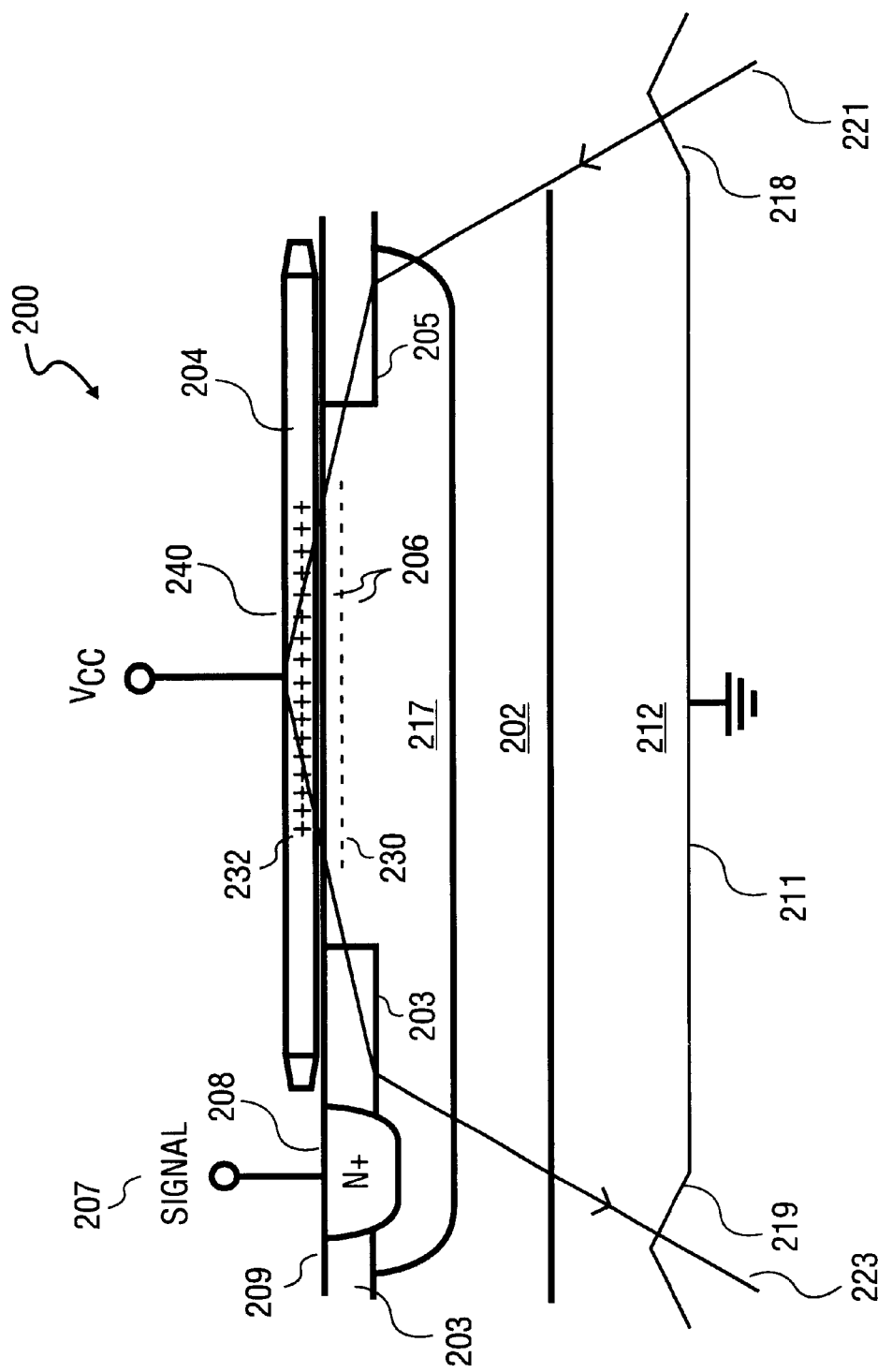
FIG. 2D is a cross section illustration along another direction of one embodiment of the optical modulator of FIGS. 2A through 2C using refractors in accordance with the teachings of the present invention.

FIG. 2D is a cross section illustration of integrated circuit die 200 along line C—C 215 of FIG. 2C. As shown, charged layers 206 are disposed between STI regions 203 and 205. In the embodiment illustrated, charged layers 206 include accumulation layers 230 and 232 and are substantially parallel to the front side 209 of semiconductor substrate 212. In one embodiment, STI regions 203 and 205 provide refractors that alter the optical path of an incident optical beam 221.

In one embodiment, optical beam 221 is directed through the back side 211 of semiconductor substrate 212. In one embodiment, optical beam 221 is directed at an oblique angle to the interface of the silicon of n-well 217 and the oxide of STI region 205 resulting in refraction. In one embodiment, this refraction alters the path of optical beam 221. In one embodiment, the path of optical beam 221 is altered to be horizontal or nearly horizontal through charged layers 206. As result, the path of optical beam 221 through charged layers 206 is in one embodiment parallel or nearly-parallel (with angle θ near zero) to the front side 209 of semiconductor substrate 212. As in FIG. 1, the optical path length L is 1/sinθ longer than it would be with the optical beam 221 at normal incidence (θ=90 degrees). In one embodiment, optical beam 221 is then directed to STI region 203, which alters the path of a modulated optical beam 223 and refracts the modulated optical beam 223 back out through the back side 211 of semiconductor substrate 212.

In one embodiment, optical beam 221 enters back side 211 of semiconductor substrate 212 at location 218. In one embodiment, modulated optical beam 223 exits through the back side 211 of semiconductor substrate 212 at location 219. It is appreciated that locations 218 and 219 may be provided in one embodiment by angling or beveling the back side 211 surface of semiconductor substrate 212 at the entry and exit locations 218 and 219 so that the angle of propagation for the refraction of optical beam 221 is horizontal or nearly horizontal through charged layers 206.

In one embodiment, a reflective material, such as for example silicide 240, is disposed over the back side surface of gate 204. In one embodiment, this silicided surface of gate 204 serves as a deflector or reflector such that optical beam 221, in a near horizontal path through charged layers 206, is reflected between the passage of optical beam 221 through STI regions 205 and 203. Thus, in one embodiment, optical beam 221 is directed into the back side 211 of semiconductor substrate 212 at location 218, refracted through STI region 205, reflected off the back side of gate 204, refracted through STI region 203 and is then directed out through the back side 211 of semiconductor substrate 212 at location 219. In one embodiment, the surfaces at locations 218 and 219 include anti-reflective coatings to reduce attenuation of optical beam 221 and modulated optical beam 223 due to reflections. In one embodiment, modulated optical beam 223 is modulated in response to signal 207 as discussed above.

Figure 3A:
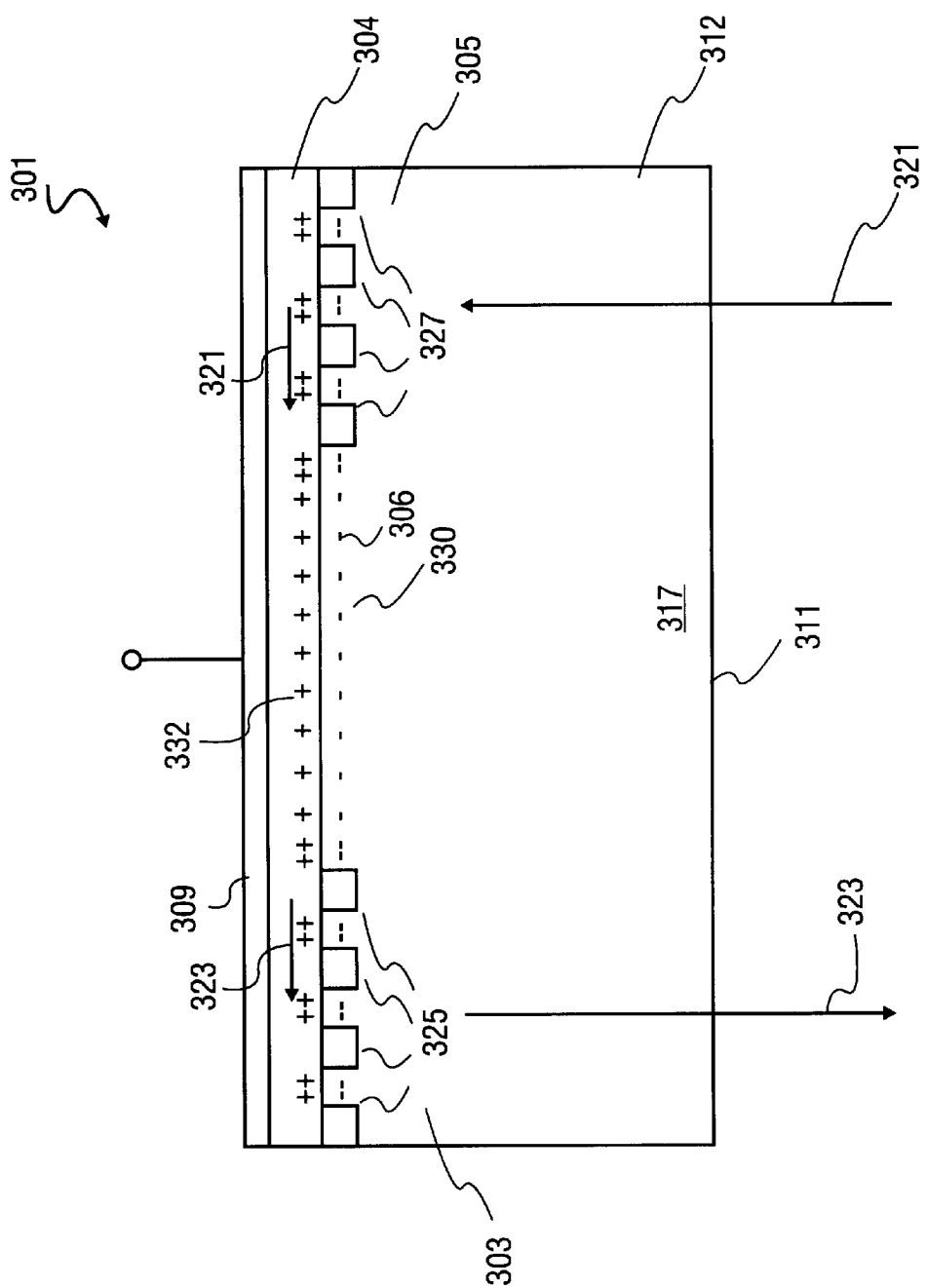
FIG. 3A is a cross section illustration along one direction of yet another embodiment an optical modulator to modulate an optical beam using grating structures in accordance with the teachings of the present invention.

FIG. 3A is a cross section illustration of yet another embodiment of an optical modulator in an integrated circuit die 301 in accordance with the teachings of the present invention. In the embodiment depicted, integrated circuit die 301 includes a p-type MOS gate structure having some similarities to the p-type MOS gate structure included in integrated circuit die 200 of FIGS. 2A through 2D. In particular, the MOS gate structure in integrated circuit die 301 includes modulated charge layers 306 including accumulation layers 330 and 332. In one embodiment, charged layers 306 are substantially parallel to the front side 309 of the semiconductor substrate 312 of integrated circuit die 301. In one embodiment, accumulation layer 332 is formed within a gate 304. In one embodiment, the MOS gate structure is formed within an n-well 317, which is included in semiconductor substrate 312. In one embodiment, gate 304 includes polysilicon and semiconductor substrate 312 includes silicon.

In the embodiment illustrated in FIG. 3A, grating structures 305 and 303 are also disposed in semiconductor substrate 312 on opposite ends of gate 304. In one embodiment, grating structures 305 and 303 include spatially periodic regions of oxide 327 and 325, respectively, disposed in the n-well 317 of semiconductor substrate 312 proximate to gate 304. As shown in the embodiment depicted in FIG. 3A, accumulation layers 330 and 332 of charged layers 306 are also between the oxide regions 325 and 327 of grating structures 303 and 305. In one embodiment, grating structures 303 and 305 include thin oxide regions between the oxide regions 325 and 327, which in one embodiment are created as part of a self-aligned field effect transistor provided by on integrated circuit die 301.

Figure 3B:
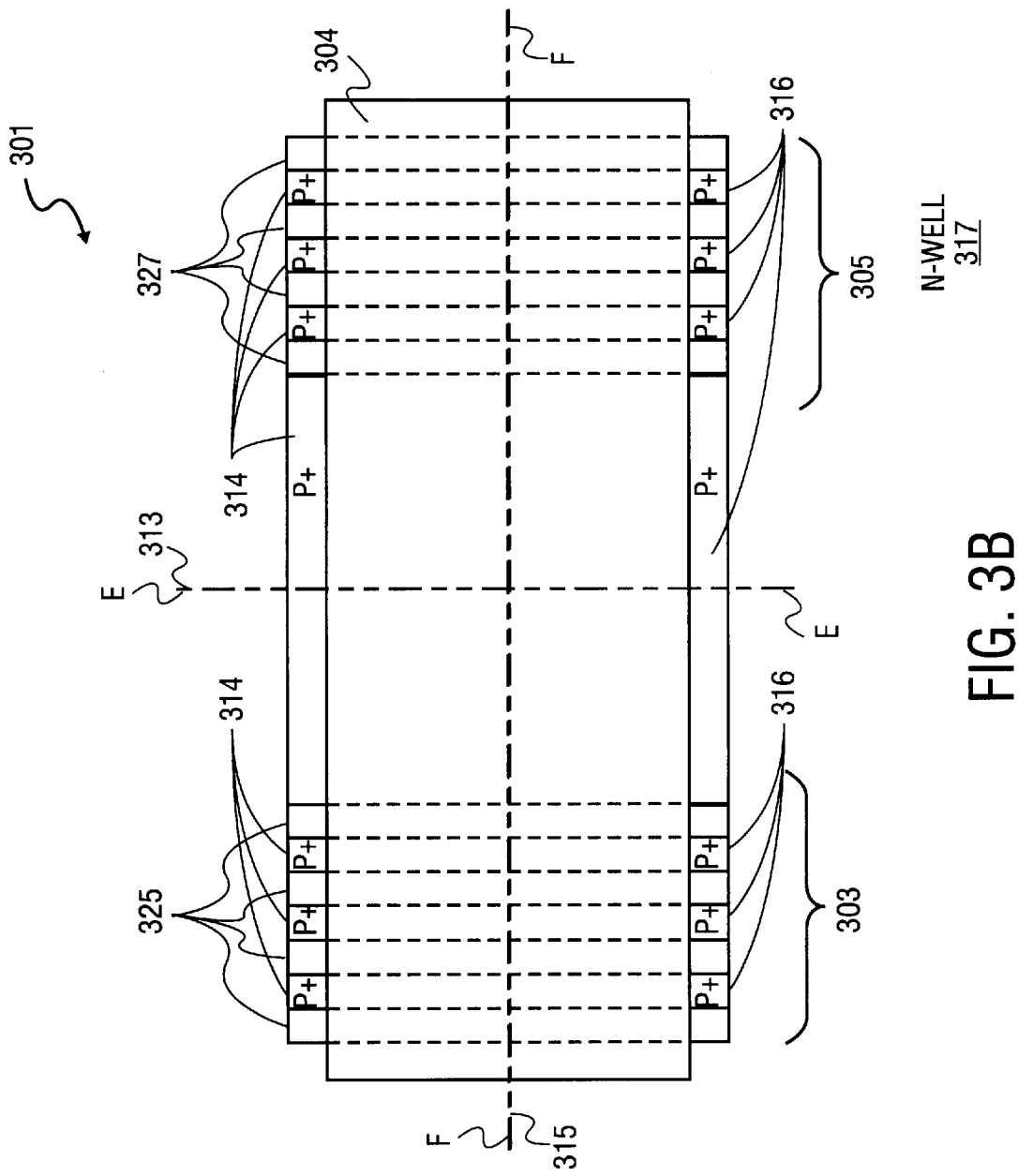
FIG. 3B is an illustration of one embodiment of a layout view of the optical modulator of FIG. 3A in accordance with the teachings of the present invention.

To illustrate, FIG. 3B is a layout view illustration of one embodiment of integrated circuit die 301 of FIG. 3A. FIG. 3B shows integrated circuit die 301 with the cross-section illustration of FIG. 3A being along line F—F 315 of FIG. 3B. As shown in FIG. 3B, gate 304 is disposed between doped regions 314 and 316 along the line E—E 313. In the direction of line F—F 315, gate 304 is disposed over spatially periodic regions of oxide 325, doped regions 314 and 316, and spatially periodic regions of oxide 327, doped regions 314 and 316, of grating structures 303 and 305, respectively. In one embodiment, doped regions 314 and 316 include p type doped silicon. In another embodiment, doped regions 314 and 316 include n type doped silicon.

FIG. 3C is a cross section illustration showing greater detail of the grating structure 305 of the optical modulator illustrated in FIGS. 3A and 3B in accordance with the teachings of the present invention. In one embodiment, grating structure 305 includes spatially periodic regions of oxide 327 proximate to polysilicon gate 304 in the n-well 317 of semiconductor substrate 306. In one embodiment, a wave front of normally incident optical beam 321 undergoes a differential phase shift in passing through the oxide of and silicon of grating structure 305. As a result, grating structure 305 stimulates a horizontally propagating wave through gate 304. In one embodiment, gate 304 therefore provides a polysilicon waveguide structure between grating structures 305 and 303. Referring briefly back to FIG. 3A, the horizontally propagating wave propagates from right to left from grating structure 305 to grating structure 303 through gate 304. Referring back to FIG. 3C, a layer of silicide 340 is disposed on gate 304. In the embodiment illustrated, half wavelength plane wave fronts are shown, which are so arranged as to satisfy boundary conditions at the reflective surfaces provided by silicide 340 and the spatially periodic regions of oxide 327.

In one embodiment, a differential phase shift of π between the periodic oxide and silicon regions of grating structure 305 matches the spatial phase shift in a waveguide mode of gate 304. Thus, the wave front of optical beam 321 is broken up by the periodic structure of grating structure 305, which induces the phase shift of π on the wave fronts arriving at the alternating sections of the grating structure 305. In one embodiment, the grating of oxide trenches in grating structure 305 is arranged with the periodicity of the anticipated guide wavelength of a polysilicon waveguide mode to be provided by gate 304. In one embodiment, when an incoming wave front propagates through the periodic oxide and silicon regions of grating structure 305 in parallel, a phase lag occurs in the oxide regions 327 because of the lower index of refraction therein. In one embodiment, the phase difference between the silicon and oxide waves at the interface to the polysilicon of gate 304 is π or an odd multiple thereof so that standing waves of polysilicon could be excited.

In one embodiment, horizontal waves may be excited to propagate through gate 304 in opposite directions towards both ends of gate 304. Referring back to FIG. 3A, the horizontal waves may be excited to propagate both left and right. In one embodiment, a strategically placed "open circuit" (not shown) may be placed proximate to the grating structure 305 to reflect the portion of optical beam 321 that propagates away from the midsection of gate 304.

In one embodiment, the modulation of charge carrier density in the charge layers 306 that form in between the oxide regions 325 and 327 in grating structures 303 and 305 will affect the reflectivity of the grating and modulate the reflected beam to some extent. In one embodiment, this modulation of the reflectivity provides an optical modulator for optical beam 321 having a suitably matched wavelength.

In sum, referring back to FIG. 3A, the optical beam 321 in one embodiment is directed into the semiconductor substrate 306 through back side 311. In one embodiment, optical beam 321 is directed to grating structure 305 through semiconductor substrate 312. In one embodiment, optical beam 321 is then turned sideways with grating structure 304 to pass horizontally through the accumulation layer 332 of the modulated charged layer 306. This produces modulated optical beam 323. Modulated optical beam 323 is then directed out from gate 304 using grating structure 303 back out through the back side 311 of semiconductor substrate 312 in the same manner optical beam 321 is directed into gate 304 using grating structure 305.

It is appreciated that, electrically, the structure of FIG. 3A through 3C, with p+ diffusions 314 and 316 and an n-well 317 forming accumulation layers 330 and 332, can work in the same way as described for FIGS. 2A through 2D. Furthermore, grating structures 303 and 305 as described in FIGS. 3A through 3C, can also be fabricated in another embodiment with n+ diffusions and operate as described in FIGS. 1A through 1C.

Figure 4A:
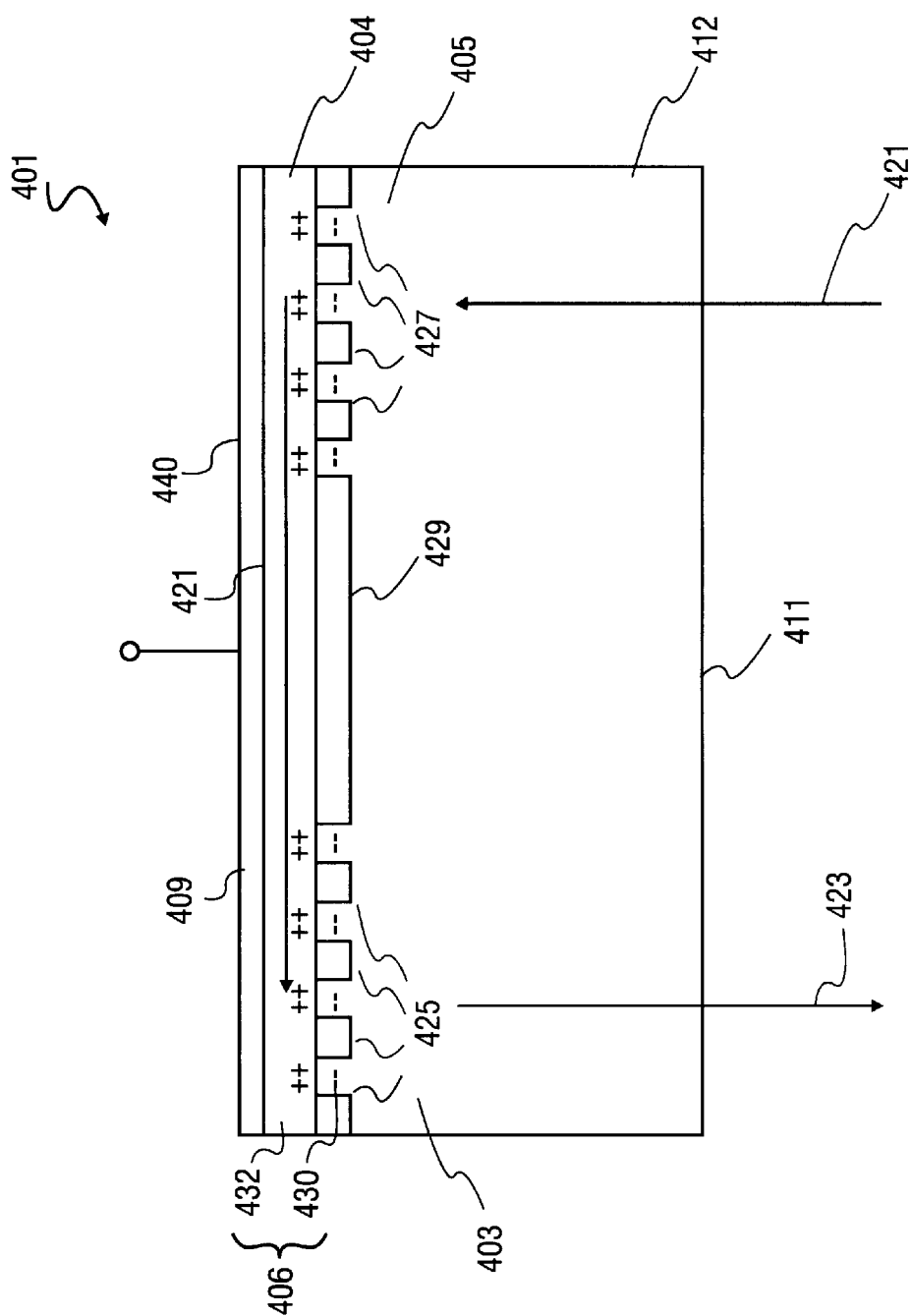
FIG. 4A is a cross section illustration along one direction of still another embodiment of an optical modulator using grating structures in accordance with the teachings of the present invention.

FIG. 4A is an illustration of a cross section of still another embodiment of an optical modulator utilizing a waveguide fabricated in an integrated circuit die 401 using a structure having some similarities to the structure shown in FIGS. 3A through 3C. In particular, integrated circuit 401 in one embodiment includes grating structures 403 and 405 disposed in a semiconductor substrate 412 proximate to a polysilicon gate layer 404. In one embodiment, grating structures 403 and 405 include spatially periodic regions of oxide 425 and 427, respectively. In one embodiment, a layer of silicide 440 is disposed on polysilicon gate layer 404 opposite grating structures 403 and 405. In one embodiment, charged layers 406, including accumulation layers 430 and 432 are modulated in the regions between oxide regions 425 and 427 of grating structures 403 and 405. In one embodiment, the charge concentration in accumulation layers 430 and 432 is modulated in response to voltages applied to gate layer 404.

In one embodiment, a normally incident optical beam 421 is directed through the back side 411 of semiconductor substrate 412 towards the front side 409 to grating structure 405. In one embodiment, optical beam 421 is turned sideways to propagate through polysilicon layer 404 due to grating structure 405 in substantially the same manner as grating structure 305 causes optical beam 321 to propagate through gate 304 as discussed in FIGS. 3A through 3C. In one embodiment, a modulated optical beam 423 is then directed out from polysilicon layer 404 using grating structure 403 back out through the back side 411 of semiconductor substrate 412 in the same manner that optical beam 421 is directed into polysilicon layer 404 using grating structure 405. In one embodiment, optical beam 421 is modulated in response to the modulated charge density in accumulation layers 430 and 432 between the oxide regions 425 and 427 of grating structures 403 and 405. As mentioned above, the modulation of charge in accumulation layers 430 and 432 affects the reflectivity of grating structures 403 and 405, which results in modulated optical beam 423 being produced. In one embodiment, the wavelength of optical beam 421 is suitably matched to provide increased modulation in accordance with the teachings of the present invention.

In the embodiment illustrated in FIG. 4A, unwanted attenuation of optical beam 421 when passing through polysilicon layer 404 is reduced by STI region 429 disposed proximate to polysilicon layer 404 in addition to the silicide 440 between grating structures 403 and 405 in semiconductor substrate 412. Attenuation is reduced in this embodiment since the oxide of STI region 429 reduces the amount of optical beam 421 that might otherwise exit polysilicon layer 404 between grating structures 403 and 405. In particular, in one embodiment, the oxide of STI region 429 deflects optical beam 421 from exiting polysilicon layer 404 as a result of TIR. Thus, it is appreciated that with silicide layer 440 bordering polysilicon layer 404 towards front side 409 and with the oxide of STI region 429 bordering polysilicon layer 404 towards back side 411 between grating structures 403 and 405, an optical waveguide with reduced attenuation is provided.

Figure 4B:
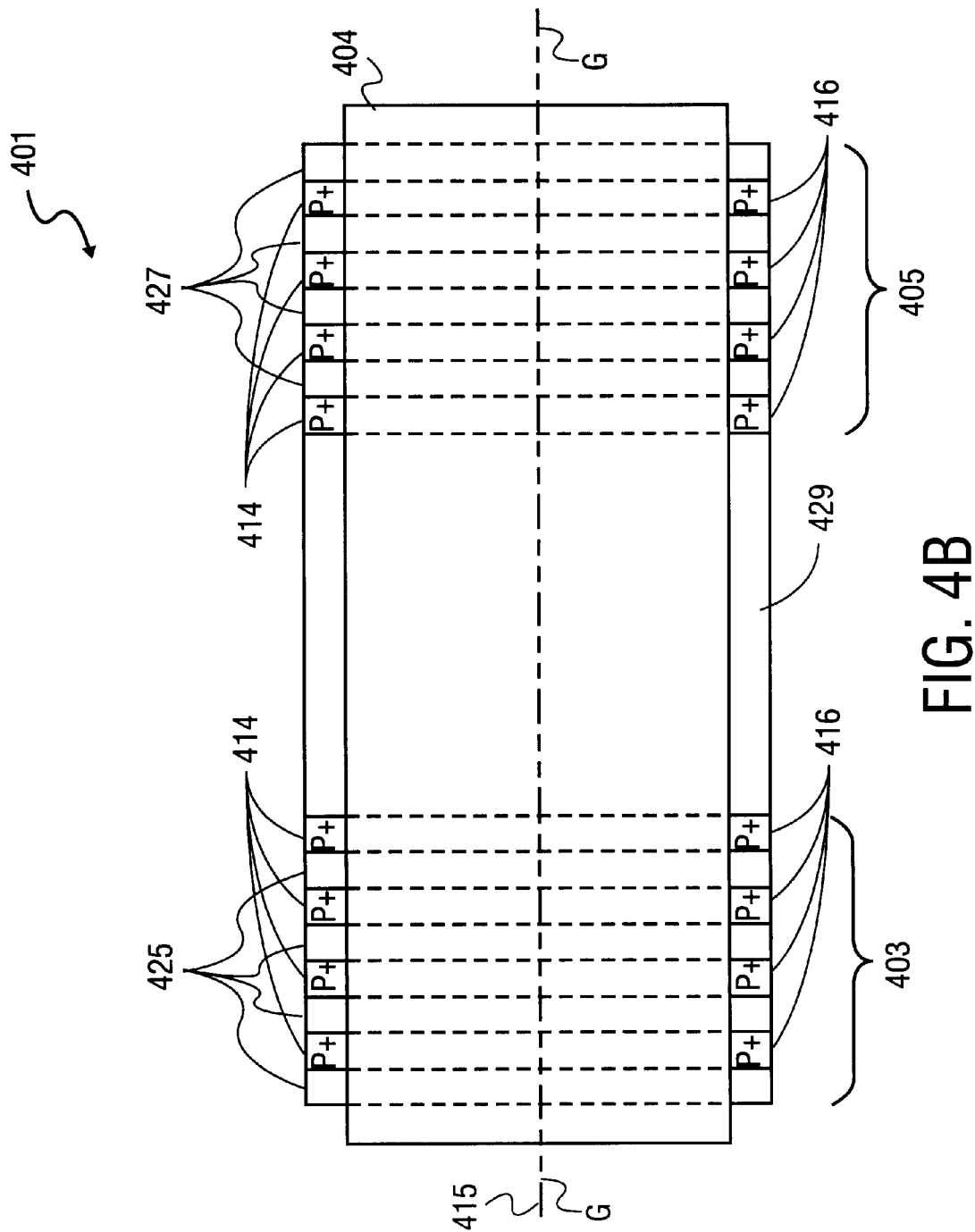
FIG. 4B is an illustration of one embodiment of a layout view of the optical modulator of FIG. 4A in accordance with the teachings of the present invention.

FIG. 4B is a layout view illustration of one embodiment of integrated circuit die 401 of FIG. 4A. FIG. 4B shows integrated circuit die 401 with the cross-section illustration of FIG. 4A being along line G—G 415 of FIG. 4B. In the embodiment shown in FIG. 4B, polysilicon layer 404 is disposed over the spatially periodic regions of oxide 425 of grating structure 403, the STI region 429 and the spatially periodic regions of oxide 427 of grating structure 405. In one embodiment, doped regions 414 and 416 are disposed between the spatially periodic regions of oxide 425 and 427. In one embodiment, doped regions 414 and 416 included p-type doped silicon. In another embodiment, doped regions 414 and 416 include n-type doped silicon. In one embodiment, a normally incident optical beam is directed into integrated circuit die 401 to grating structure 405 and passes through the waveguide formed with polysilicon layer 404 from right to left in FIG. 4B. The optical beam is then directed out polysilicon layer 404 with grating structure 403 and then out of integrated circuit die 401.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical modulator, comprising:

a metal oxide semiconductor (MOS) gate structure disposed in a semiconductor material of an integrated circuit die, the semiconductor material having a front side and a back side;

a charged layer between first and second source/drain regions of the MOS gate structure, the charged layer substantially parallel to the front side of the semiconductor material; and first and second refractors disposed on opposite sides of the charged layer in the semiconductor material, an optical beam to be directed through the back side of the semiconductor material, through the first refractor, through the charged layer, through the second refractor and back out the back side of the semiconductor material.

2. The optical modulator of claim 1 further comprising a deflector disposed proximate to a gate of the MOS gate structure, the optical beam to be deflected by the deflector between the first and second refractors.

3. The optical modulator of claim 2 wherein the deflector comprises silicide disposed on the gate of the MOS gate structure.

4. The optical modulator of claim 1 wherein the back side of the semiconductor material includes a first angled location and a second angled location, the optical beam to enter and exit the semiconductor material at the first and second angled locations, respectively.

5. The optical modulator of claim 1 wherein the first and second refractors comprise oxide.

6. The optical modulator of claim 1 wherein the semiconductor material comprises silicon.

7. The optical modulator of claim 1 wherein the semiconductor material comprises a substrate, the MOS gate structure and the first and second refractors disposed in the substrate.

8. The optical modulator of claim 1 wherein the semiconductor material comprises a well, the MOS gate structure and the first and second refractors disposed in the well.

9. The optical modulator of claim 1 wherein the semiconductor material comprises an epitaxy layer, the MOS gate structure and the first and second refractors disposed in the epitaxy layer.

10. The optical modulator of claim 1 wherein a free charge distribution of the charged layer is modulated in response to a signal of the integrated circuit die.

11. An optical modulator, comprising:

a metal oxide semiconductor (MOS) gate structure disposed in a semiconductor material of an integrated circuit die, the semiconductor material having a front side and a back side;

a charged layer between first and second source/drain regions of the MOS gate structure, the charged layer substantially parallel to the front side of the semiconductor material; and first and second grating structures disposed on opposite sides of the MOS gate structure in the semiconductor material, an optical beam to be directed through the back side of the semiconductor material, through the first grating structure, through the charged layer, through the second grating structure and back out the back side of the semiconductor material.

12. The optical modulator of claim 11 wherein the charged layer is included in a gate of the MOS gate structure and in the first and second gratings, the optical beam to be directed through the gate between the first and second grating structures.

13. The optical modulator of claim 12 further comprising a waveguide optically coupling the first and second grating structures, the waveguide including the gate of the MOS gate structure.

14. The optical modulator of claim 12 wherein the gate of the MOS gate structure comprises polysilicon, wherein the optical beam is to undergo differential phase shift in passing through the first grating to stimulate propagation of the optical beam through the charged layer to the second grating.

15. The optical modulator of claim 12 further comprising a reflective layer disposed proximate to the gate.

16. The optical modulator of claim 15 wherein the reflective layer comprises silicide.

17. The optical modulator of claim 12 further comprising an insulating layer disposed proximate to the gate.

18. The optical modulator of claim 14 wherein the first and second grating structures comprise spatially periodic regions of oxide in the semiconductor material.

19. The optical modulator of claim 11 wherein a free charge distribution of the charged layer is modulated in response to a signal of the integrated circuit die.

20. A method of modulating an optical beam, comprising:
    directing an optical beam through a back side of a semiconductor substrate through a first refractor disposed in the semiconductor substrate of an integrated circuit die;
    directing the optical beam from the first refractor through a charged layer substantially parallel to a front side of the semiconductor substrate, the optical beam directed along the charged layer to a second refractor;
    directing the optical beam from the second refractor back out through the back side of the semiconductor substrate; and
    modulating a free charge density of the charged layer in response to a signal of the integrated circuit die.

21. The method of claim 20 further comprising reflecting the optical beam with a reflector disposed between the first and second refractors.

22. A method of modulating an optical beam, comprising:
    directing an optical beam through a back side of a semiconductor substrate through a first grating structure disposed in the semiconductor substrate of an integrated circuit die;
    directing the optical beam from the first grating structure through a charged layer substantially parallel to a front side of the semiconductor substrate, the optical beam directed along the charged layer to a second grating structure;
    directing the optical beam from the second grating structure back out through the back side of the semiconductor substrate; and
    modulating a free charge density of the charged layer in response to a signal of the integrated circuit die.

23. The method of claim 22 wherein directing the optical beam from the first grating structure through the charged layer comprises inducing a differential phase shift in the optical beam with the first grating structure.

24. The method of claim 22 wherein directing the optical beam from the second grating structure back out through the back side of the semiconductor substrate comprises inducing a differential phase shift in the optical beam with the second grating structure.

25. An optical modulator, comprising:
    a polysilicon layer optically coupled to a semiconductor substrate of an integrated circuit die;
    a first grating structure disposed in the semiconductor substrate proximate to the polysilicon layer; and
    a second grating structure disposed in the semiconductor substrate proximate to the polysilicon layer, a charged layer included in the first and second grating structures to be modulated in response to a signal coupled to the optical modulator, an optical beam to be directed through the semiconductor substrate to the first grating structure, through the polysilicon layer to the second grating structure and back out through the semiconductor substrate, the optical beam to be modulated in response to the signal.

26. The optical modulator of claim 25 further comprising a reflective layer disposed proximate to the polysilicon layer.

27. The optical modulator of claim 26 wherein the reflective layer comprises silicide.

28. The optical modulator of claim 25 further comprising an insulative layer disposed proximate to the polysilicon layer.

29. The optical modulator of claim 25 wherein the first and second grating structures comprise spatially periodic regions of oxide disposed in the semiconductor material proximate to the polysilicon layer.

30. The optical modulator of claim 25 wherein the optical beam is to be directed at normal incidence to the first grating structure, the first grating structure to induce a phase shift in wave fronts of the optical beam arriving at alternating sections of the first grating structure, the first grating structure to direct at least a portion of the optical beam through the polysilicon layer to the second grating structure.

* * * * *